United States Patent
Cheng et al.

(10) Patent No.: US 7,826,908 B2
(45) Date of Patent: Nov. 2, 2010

(54) VARIABLE RATE FEEDFORWARD CONTROL BASED ON SET POINT RATE OF CHANGE

(75) Inventors: Xu Cheng, Pittsburgh, PA (US); Charles H. Menten, Gibsonia, PA (US); Richard W. Kephart, Kittanning, PA (US)

(73) Assignee: Emerson Process Management Power & Water Solutions, Inc., Pittsburgh, PA (US)

(*) Notice: Subject to any disclaimer, the term of this patent is extended or adjusted under 35 U.S.C. 154(b) by 142 days.

(21) Appl. No.: 11/934,633

(22) Filed: Nov. 2, 2007

(65) Prior Publication Data

US 2009/0118873 A1    May 7, 2009

(51) Int. Cl.
- G05B 13/02 (2006.01)
- G05D 3/12 (2006.01)
- G05D 5/00 (2006.01)
- G05D 9/00 (2006.01)
- G05D 11/00 (2006.01)
- G05D 17/00 (2006.01)
- F01K 13/02 (2006.01)
- F01K 7/40 (2006.01)

(52) U.S. Cl. .......................... 700/44; 700/45; 700/286; 700/287; 700/290; 700/296; 60/665; 60/667

(58) Field of Classification Search ............. 700/44–45, 700/286–287, 290–291, 295–296; 60/665, 60/667

See application file for complete search history.

(56) References Cited

U.S. PATENT DOCUMENTS 4,028,884 A * 6/1977 Martz et al. ............... 60/39.182

(Continued)

FOREIGN PATENT DOCUMENTS

GB    1 528 596    10/1978

OTHER PUBLICATIONS

Search Report for Application No. GB0819922.6, dated Jan. 29, 2009.

*Primary Examiner*—Ramesh B Patel

(57) ABSTRACT

A method of controlling a power generating unit or other process equipment with a slow reaction time includes creating a feedforward control signal to selectively include a fast response rate component or a slow response rate component based on the average rate at which a load demand set point signal has changed during a particular previous period of time. The method then uses the developed feedforward control signal to control the power generating equipment or other slowly reacting process equipment. In particular, a control method switches between introducing a fast or a slow response component within a feedforward control signal based on whether the change in the load demand set point over a particular period of time in the past (e.g., an average rate of change of the load demand set point signal) is greater than or less than a predetermined threshold. This method is capable of providing a relatively fast control action even if the expected load demand set point change is in a small range. In addition, this method does not require knowledge of the final or target load demand set point during the time in which the load demand set point is ramping up to a final target value and is not dependent on the ramp size, i.e., the ultimate difference between the load demand set point at the beginning of the load demand set point change and the final or target value of the load demand set point, making it more versatile than prior art systems.

24 Claims, 6 Drawing Sheets

U.S. PATENT DOCUMENTS

| | | | |
|---|---|---|---|
| 4,427,896 A | * | 1/1984 | Waldron .................... 290/40 R |
| 4,536,126 A | * | 8/1985 | Reuther .................... 290/40 R |
| 4,687,946 A | * | 8/1987 | Jones ....................... 290/40 R |
| 6,263,675 B1 | * | 7/2001 | Hansen et al. ................ 60/649 |
| 2004/0249775 A1 | | 12/2004 | Chen |
| 2006/0101824 A1 | * | 5/2006 | Takeda et al. ................ 60/727 |

* cited by examiner

VARIABLE RATE FEEDFORWARD CONTROL BASED ON SET POINT RATE OF CHANGE

TECHNICAL FIELD

This patent relates generally to the control of process and power generating equipment and, in particular, to the implementation of a variable rate feedfoward control circuit to be used in reducing the control response time of power generating equipment/process or other plant equipment with similar response characteristics.

BACKGROUND

A variety of industrial as well as non-industrial applications use fuel burning boilers which typically operate to convert chemical energy into thermal energy by burning one of various types of fuels, such as coal, gas, oil, waste material, etc. An exemplary use of fuel burning boilers is in thermal power generators, wherein fuel burning furnaces generate steam from water traveling through a number of pipes and tubes within a boiler, and the generated steam is then used to operate one or more steam turbines to generate electricity. The electrical or power output of a thermal power generator is a function of the amount of heat generated in a boiler, wherein the amount of heat is directly determined by the amount of fuel consumed (e.g., burned) per hour, for example.

A typical steam generating system used in a power plant includes a boiler having a superheater section (having one or more sub-sections) in which steam is produced and is then provided to and used within a first, typically high pressure, steam turbine. To increase the efficiency of the system, the steam exiting this first steam turbine may then be reheated in a reheater section of the boiler, which may include one or more subsections, and the reheated steam is then provided to a second, typically lower pressure steam turbine. However, as is known, both the furnace/boiler section of the power system as well as the turbine section of the power system must be controlled in a coordinated manner to produce a desired amount of power.

Moreover, as is known, the steam turbines of a power plant are typically run at different operating levels at different times to produce different amounts of electricity or power based on variable energy or load demands provided to the power plant. For example, in many cases, a power plant is tied into an electrical power distribution network, sometimes called a power grid, and provides a designated amount of power to the power grid. In this case, a power grid manager or control authority typically manages the power grid to keep the voltage levels on the power grid at constant or near-constant levels (that is, within rated levels) and to provide a consistent supply of power based on the current demand for electricity (power) placed on the power grid by power consumers. Of course, the grid manager typically plans for heavier use and thus greater power requirements during certain times of the days than others, and during certain days of the week and year than others, and may run one or more optimization routines to determine the optimal amount and type of power that needs to be generated at any particular time by the various power plants connected to the grid to meet the current or expected overall power demands on the power grid.

As part of this process, the grid manager typically sends power demand requirements (also called load demand set points) to each of the power plants supplying power to the power grid, wherein the power demand requirements or load demand set points specify the amount of power that each particular power plant is to provide onto the power grid at any particular time. Of course, to effect proper control of the power grid, the grid manager may send new load demand set points for the different power plants connected to the power grid at any time, to account for expected and/or unexpected changes in power being supplied to or consumed from the power grid. For example, the grid manager may change the load demand set point for a particular power plant in response to expected or unexpected changes in the demand (which is typically higher during normal business hours and on weekdays, than at night and on weekends). Likewise, the grid manager may change the load demand set point for a particular power plant in response to an unexpected or expected reduction in the supply of power on the grid, such as that caused by one or more power units at a particular power plant failing unexpectedly or being brought off-line for normal or scheduled maintenance.

In any event, while the grid manager may provide or change the load demand set points for particular power plants at any time, the power plants themselves cannot generally increase or decrease the amount of power being supplied to the power grid instantaneously, because power generation equipment typically exhibits a significant lag in response time due to the physical characteristics of these systems. For example, to increase the power output of a steam turbine based power generation system, it is necessary to change the amount of fuel being spent within the system, to thereby increase the steam pressure or temperature of the water within the boiler of the system, all of which takes a finite and non-trivial amount of time. Thus, generally speaking, power plants can only ramp up or ramp down the amount of power being supplied to the grid at a particular rate, which is based on the specifics of the power generating equipment within the plant. Thus, when the grid manager changes the load demand set point for any particular power plant, the grid manager typically provides both a new target load demand (to be reached at some particular time in the future) and a ramp rate specifying the manner in which the load demand set point changes over the time between the current time and the particular time in the future. Generally speaking, the ramp rate indicates the manner in which the load demand set point for the power plant is to ramp up or down (change) over time between the current load demand set point and the target load demand set point.

In power plants that use a boiler to produce power, a power plant controller typically uses a feedforward controller to increase or decrease the output power in response to a change in the load demand, which may be made either locally or by a remote dispatch (e.g., by the grid manager). To change output power of the plant, the load demand set point (which may be expressed as a power demand, e.g., megawatts, or as a percentage of capacity) is typically converted to a unit load index which serves as a master feedforward demand signal for both the boiler and the turbine of each power generator unit. The boiler master demand signal then becomes the basis for producing both a master fuel control signal and a master air control signal used to control the fuel (e.g., coal) and the air flow provided to the furnace of the boiler.

Due to the sluggish nature of a boiler response however, the boiler master (or fuel master) demand is typically computed with a derivative component (i.e., a "lead" component from a frequency domain transfer function perspective), or a so-called "kicker," which increases the response rate of the boiler, instead of using a simple linear function of the load demand index (a straight line) as the feedfoward control signal. An immediate drawback of using a derivative action as a basis for adding a lead component or a "kicker" when computing the feedforward control signal is that this derivative component risks creating a large overshoot and swing in both the unit load and the steam temperature of the boiler when the change in the load demand set point is large and/or the load demand set point ramps or ranges over a long period of time. This problem is especially prominent for a relatively fast response boilers (for example, cyclone boilers).

To solve the problem of overshoot and swing, it is known to derive the unit load index based feedforward control signal to include a derivative "kicking" action based on the difference between the current load demand set point and the final target load demand set point, such that the derivative kicking action is stronger or more prominent at the beginning of the load demand ramp (when the difference between the current load demand set point and the target load demand set point is above a preset threshold) and the derivative action weakens significantly (or is halted altogether) near the end of the ramp (i.e., when the difference between the current load demand set point and the target load demand set point is less than a preset threshold). However, this strategy has significant shortcomings in that (1) this technique loses the derivative "kicking" action when the load demand ramp range is relatively small (i.e., when the difference between a current load demand set point and the final target load demand set point is initially small to begin with) and (2) this technique has to rely on the knowledge of the final target load demand set point to determine when to remove or lessen the derivative "kicking" action within the feedforward control signal.

Unfortunately, many changes made to the load demand set point by, for example, a grid manager, are relatively small in nature and, in many cases, may not be large enough to initiate any derivative "kicking" action when a change in load demand is initially made by the grid manager (which is the time that the derivative "kicking" action is most beneficial). Additionally, in many instances, the actual final or target load demand set point value is unknown to the control system of the process plant producing the power because the remote dispatch center or grid manager only sends an incremental pulse signal to the local plant increasing the load demand set point, without informing the plant of the final target load demand to which the plant is moving. In this case, the addition of the derivative "kicking" action is difficult or impossible to apply with any certainty or effectiveness as the plant must estimate a target or final load demand set point (which may lead to over-aggressive control) or must assume that the target load demand set point is simply the next value sent by the dispatcher (which typically leads to under-aggressive control).

SUMMARY

A method of controlling a power generating unit or other type of process having equipment with slow reaction characteristics develops a feedforward control signal to selectively include a "lead" or "lag" component (a high rate response component or a low rate response component) based on the amount by which the load demand set point has changed during a particular previous period of time (i.e., the average rate of change), and then uses the developed feedforward control signal to control the power generating equipment or other slow reacting equipment. More particularly, a control method disclosed herein switches between introducing a faster response rate characteristic or a slower response rate characteristic within a feedforward control signal used to control the operation of equipment based on whether the amount of change in the load demand set point over a particular period of time in the past (i.e., the average of the load demand set point rate of change) is greater than or less than a predetermined threshold.

A simple example of this technique computes an average rate of change of the load demand set point over a particular period of time in the past (for example, the past 10 minutes) by computing the difference between the current load demand set point and the load demand set point present at a particular time in the past (e.g., 10 minute ago), and dividing this difference by the length of time. This computed average rate of change in the load demand set point is then compared to a preset threshold, and a fast or leading response characteristic or "kicking" action is applied to the feedforward control signal when the computed average load demand set point rate of change is less than the preset threshold. On the other hand, when the computed average load demand set point rate of change is greater than the preset threshold, a slow or lagging response characteristic is applied to the feedforward control signal. Generally speaking, this techniques operates on the theory that the longer the period of time that the load demand set point has been ramping through a change and/or the more that the load demand set point has changed (i.e., the greater the change in magnitude of this set point) over a particular period of time in the past, the less there is a need for a high response rate or leading response action within the feedfoward control signal.

Advantageously, implementation of this control technique does not require knowledge of the final or target load demand set point during the time in which the load demand set point is ramping up to a final target value. Moreover, implementation of this control technique is not dependent on the ramp size, i.e., the ultimate difference between the load demand set point at the beginning of the load demand set point change and the final or target load demand set point. As a result, this technique may be used to produce a higher rate kicking action in the feedforward control signal even in response to small load demand set point changes and in response to load demand set point changes that are provided incrementally or piecemeal to the plant without knowledge of the final or target load demand set point that is ultimately to be reached.

In one embodiment, a nonlinear function, such as a fuzzy logic function or technique, may be used to implement switching between the "fast" and "slow" or the leading and lagging feedforward control signal rates to thereby smooth the effects of the non-linearity introduced into the final feedforward control signal by implementation of this switching action between fast and slow response rates at the threshold.

DETAILED DESCRIPTION

Figure 1:
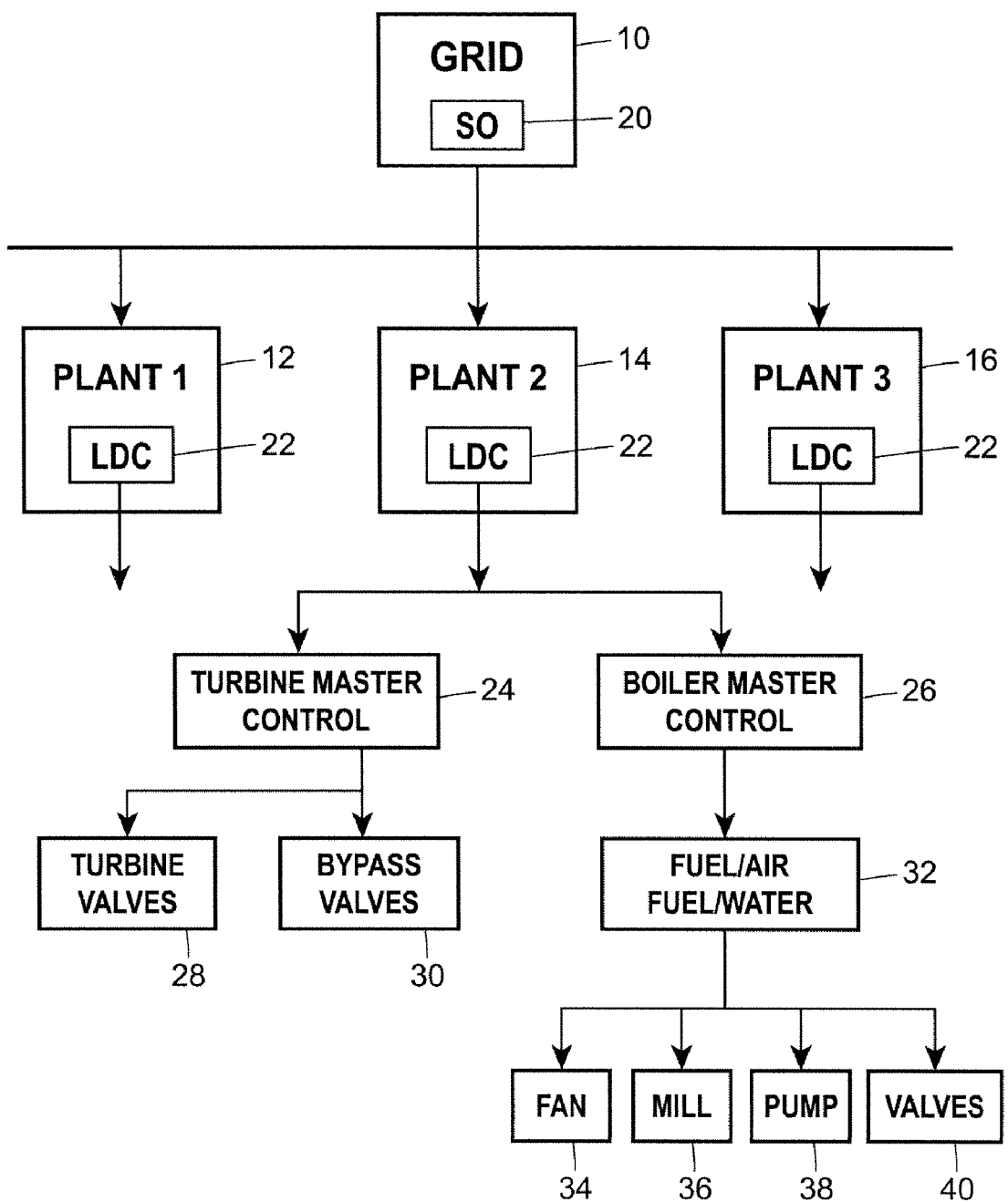
FIG. 1 illustrates a block diagram of a power grid having numerous power generating plants connected thereto.

Referring now to FIG. 1, a power grid 10 is electrically and communicatively connected to each of a number of power plants 12, 14 and 16, as well as to additional power plants not shown in FIG. 1, wherein the power plants 12, 14, 16 operate to provide power to the power grid 10. As will be understood, the power on the power grid 10 is used or consumed by customers or other power consumers (not shown in FIG. 1) connected to the power grid 10. Generally speaking, a grid manager, indicated in FIG. 1 as a system operator (SO) 20, is connected to and manages the power on the grid 10 by determining and then sending different load demand set point signals to each of the plants 12, 14 and 16. These load demand set point signals may be generated by the system operator 20 in any known or desired manner and may, for example, be generated using an optimization technique. Generally speaking, these load demand set point signals indicate the amount of power (generally in terms of megawatts) to be provided by each plant 12, 14 and 16 to the power grid 10 at any particular time. More particularly, the system operator 20 maintains the voltage level on the power grid 10 at a rated level and assures that enough power (both active and reactive) is provided to the power grid 10 to satisfy the current and/or the projected future demand on the power grid 10 at any particular time by generating and sending load demand set point signals to each of the plants 12, 14 and 16.

Unfortunately, as is generally known, the power plants 12, 14, 16 cannot instantaneously change the amount of power being provided to the power grid 10, especially if the power plants 12, 14, 16 use slow-reacting types of power generating equipment, such as pulverized coal-fired power generating units. Thus, the system operator 20, when providing each power plant 12, 14, 16 with a load demand set point signal, generally does so by providing a new target load demand set point to be reached at some point in the future and a rate at which the power plant is to ramp tip to the target load demand set point (thereby specifying a set of load demand set point signals to be used between the current time and the time at which the target load demand set point signal is to be reached). Thus, the system operator 20 may provide a power plant, for example, the power plant 14, with a new target load demand set point to be reached at a particular time in the future and a ramp rate at which the power output by the power plant 14 will change over the time between the current time and the time at which the target load demand set point is to be reached. Generally speaking, the ramp rate provided by the system operator 20 to any particular power plant 12, 14, 16 is based on (i.e., is equal to or less than) the maximum allowed or specified rate at which these plants may change their power output, which rates are provided by the plants 12, 14, 16 to the system operator 20 when the plants 12, 14, 16 come on-line or are commissioned or sign up for regulation control. In other circumstances, however, the system operator 20 may provide each power plant 12, 14, 16 with a new load demand set point at numerous periodic times (such as once every minute, once every 10 minutes, etc.) with the new load demand at each time being calculated to be within the specified or allowable ramp rate for each power plant.

In one example, the system operator 20 operates in, for example, 10-minute increments, whereby the system operator 20 provides each power plant 12, 14, 16 with an amount of power (load demand set point) that each plant should be placing or providing onto the power grid 10 at the end of the next 10 minute target period, and may provide a ramp rate at which the plant should ramp up to that power over the time between the current time and the end of the next 10 minute interval. In this example, a plant may, for example, indicate that it can provide 10 additional megawatts of power per minute and thus can ramp up, over a 10-minute period, to provide 100 additional megawatts of power, while a second plant may, for example, only be able to provide one additional megawatt of power per minute and thus can only ramp up to provide 10 additional megawatts of power over any particular 10-minute period.

In any event, referring again to FIG. 1, the system operator 20 provides, periodically or at non-fixed times, new load demand set point signals to each of the plants 10, 12, 14, and these load demand set point signals include load demand set points which are provided to a load demand computer (LDC) 22 located within each of the plants 12, 14, 16. The LDCs 22 within the plants 12, 14 and 16 use the load demand set points as primary control signals to be used to control the individual power generating units within the plant. As illustrated for the plant 14, which is, in this case, a boiler operated steam turbine power plant, an LCD 22 uses the received load demand set point signal to produce a load demand index, which is then provided to a turbine master control unit 24 and to a boiler master control unit 26 within the plant 14. As shown in FIG. 1, the turbine master control unit 24 uses the LDC index to control turbine valves 28 and bypass valves 30, as well as additional or other turbine equipment used to generate electricity based on steam produced by the boiler system of the plant. In a similar manner, the boiler master control unit 26 uses the LDC index provided by the LDC 22 to compute a fuel flow, air flow, and water flow demand signal used within the boiler system to control the operations of fans 34, mills 36, pumps 38, valves 40, as well as other equipment within the boiler system to operate the boiler to produce the amount of steam pressure needed to drive the turbines at a particular power generating capacity.

Figure 2:
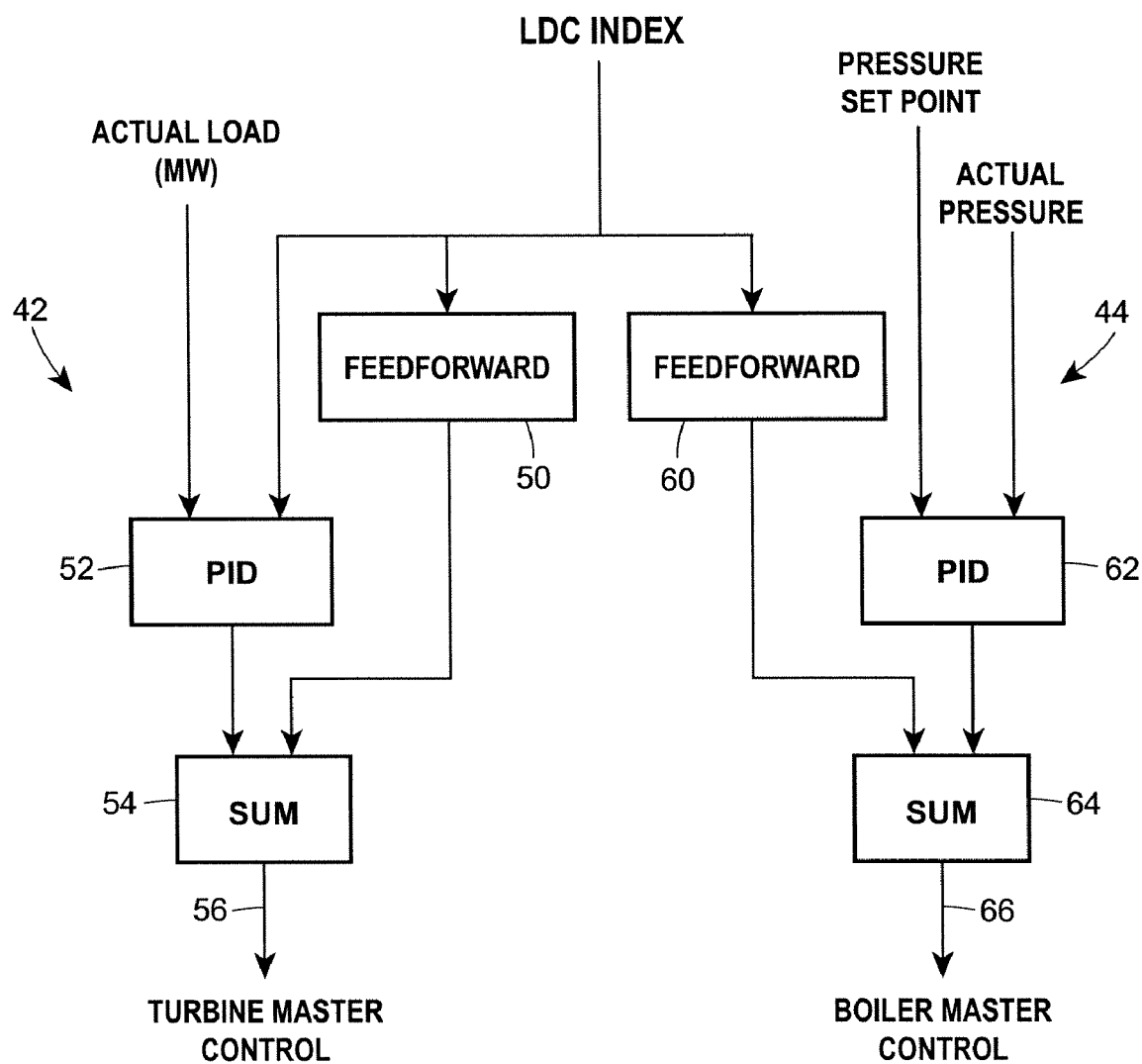
FIG. 2 illustrates a schematic block diagram of a control circuit used to provide both feedforward and feedback control in a power plant having a boiler system and a turbine system.

FIG. 2 illustrates a more detailed flow diagram associated with a control system that may be used in one or more of the plants 12, 14, 16 as part of the turbine master control and boiler master control units 24 and 26. As illustrated in FIG. 2, the LDC index produced by the LDC 22 is used in two separate control paths 42 and 44, with the first control path 42 being responsible for producing a control signal within the turbine master control unit 24 of FIG. 1 and the second control path 44 being responsible for producing a boiler master control signal within the boiler master control unit 26 of FIG. 1.

As shown in FIG. 2, the LDC index is provided to both a feedforward controller 50 and a feedback controller 52 in the turbine control path 42 which, in this case, are connected in a boiler follow mode although the well-known turbine follow mode of control could be used instead. In this case, the feedback controller 52 is indicated as being a proportional, integral, derivative (PID) controller although other types of controllers could be used instead. Generally speaking, the feedback controller 52 compares the actual load currently being produced (e.g., in megawatts or in percentage of capacity) to the LDC index (which may also be in megawatts or percentage capacity) to produce an error signal (not shown). The PID controller 52 uses the error signal to produce a first turbine control signal which is provided to a signal combiner shown as a summer 54. The feedforward controller 50 operates on the LDC index and produces a feedforward control signal which is also provided to the summer 54. The feedback control signals (from the PID controller 52) and the feedforward control signal (from the controller 50) are combined in the summer 54 to produce a turbine master control signal 56. In one example, the summer 54 may operate to sum the feedforward and feedback control signals and to scale the summed signal if necessary to produce an appropriate master control signal for the turbine system.

In a similar manner, the LDC index is provided to a feedforward controller 60 associated with the boiler control path 44, while a feedback controller 62 (illustrated as a PID controller) in the path 44 receives a pressure set point and an indication of the actual measured pressure within the boiler. The PID controller 62 compares, for example, the actual measured pressure in the boiler to the pressure set point, and produces a feedback control signal using any known PID control technique. The feedback control signal is provided to a signal combiner illustrated in FIG. 2 as a summer 64. Likewise, the feedforward controller 60 uses the LDC index to produce a feedforward control signal which is also provided to the summer 64. The summer 64 operates to combine the feedback control signal produced by the PID controller 62 with the feedforward control signal produced by the controller 60 to develop a boiler master control signal 66. Of course, the summer 64 may perform averaging, or weighted averaging of the two received control signals, and may perform scaling or some other combination procedure, to produce the master boiler control signal 66.

Generally speaking, one or both of the feedforward controllers 50 and 60 may operate to produce a feedforward control signal that includes a fast response rate component or a high "kicker" at certain times and that includes a slow response rate component or a low "kicker" (or even a "lagging kicker") at other times based on a rate of change of the load demand set point over a previous period of time. In particular, the feedforward controller 60 may create a feedforward control signal that initiates a faster response in the power plant equipment when the rate of change of the LDC index (also referred to herein as the load demand set point) over a particular period of time in the past is lower then a preset threshold, which typically occurs when the load demand set point initially changes after being steady for a while, or changes slowly and thus has not ramped through a large magnitude change over the particular or fixed period of time. Alternatively, the feedforward controller 60 may initiate a slower response within the power plant equipment when the average rate of change of the load demand set point over the particular period of time in the past is greater then the preset threshold, which typically occurs when the load demand set point has been changing for a significant period of time or has undergone a large amount of magnitude change in the particular period of time. As one example, one or both of the feedforward controllers 50 and 60 may develop feedforward control signals to include a fast "kicking" component (e.g. a leading component) when the moving average of the load demand set point rate of change is below a particular or preset threshold and to include a "slow" kicking component (or no "kicking" component, or even "lagging" component) when the moving average of the load demand set point rate of change is above a particular or preset threshold.

To implement this procedure, the feedforward controller 60, for example, may compute the difference between the load demand set point at the current time and a load demand set point at a previous time (such as at a fixed amount of time prior to the current time) to determine what type of feedforward control signal to use, i.e., one with a fast or a slow component. In one example, the difference between the current load demand set point and a previous load demand set point (at a predetermined time in the past relative to the current time) is calculated to determine an average rate of change of the load demand set point over the predetermined period of time. This average load demand set point rate of change may then be compared to a predetermined threshold. If the average load demand set point rate of change is less than the predetermined threshold, then a fast or high response feedforward component is integrated into or is used to produce the feedforward control signal. On the other hand, if the average load demand set point rate of change is greater than the predetermined threshold, then a slow or low response feedforward component is integrated into or is used to produce the feedforward control signal to reduce or prevent overshoot and swing in the response of the system.

Using this technique, when the load demand set point is changing (i.e., when the load demand set point for the current time is not equal to a final or target load demand), and when a change in the load demand set point over a moving window of time in the past (with a fixed length) is less than a threshold (but greater than zero), the power plant control system has generally not been operating to ramp up the output of the plant for a very long period of time. In this situation, it is desirable to speed up the manner in which the power plant responds to the new load demand set point by producing a feedforward control signal with a fast "kicker" component. Conversely, when the load demand set point is changing (i.e., the load demand set point for the current time is not equal to the target load demand), and when a change in the load demand set point over the moving window of time in the past of a fixed length is greater than the threshold, the system has generally been responding to set point changes for a significant period of time (possibly using a feedforward control signal with a fast "kicker" component) and thus may be close to reaching the target load demand set point. In this case, it is desirable to use a feedforward control signal with a slow (e.g. a lagging or no) "kicking" component, to prevent the output of the plant from exhibiting overshoot and swing in reaching the target output power.

Thus, contrary to prior control systems, the feedforward control system described herein switches between creating a feedfoward control signal with a relatively fast response or with a relatively slow response based on rate at which the load demand set point has been changing in the past and, in particular, based on the difference between the load demand set point that existed at some particular time in past, such as 10 minutes ago, and the current load demand set point. This control system thereby creates a feedforward control signal that includes a high kicker component at some point without causing significant overshoot or swing and without regard to the target or final load demand set point to be reached by the plant at some point in the future (which target load demand set point may or may not be known to the plant control system).

Figure 3:
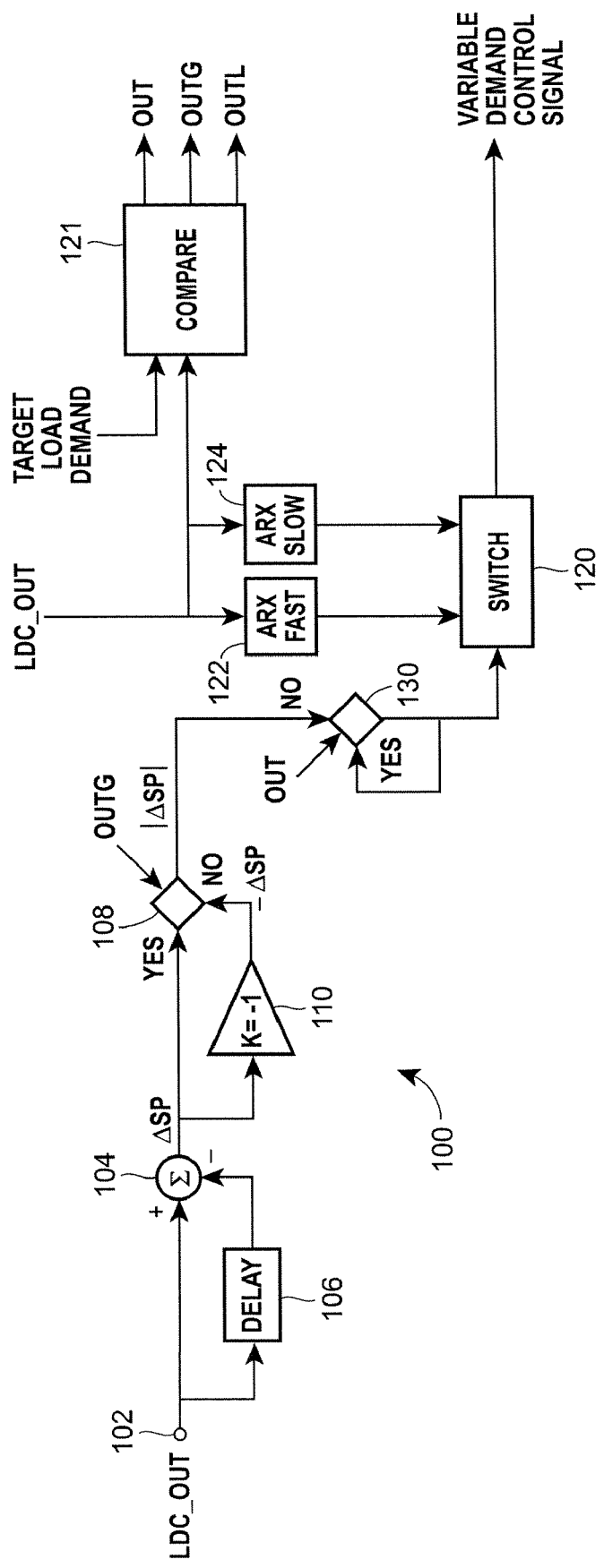
FIG. 3 illustrates a block diagram of an example control routine used as part of a feedforward control circuit of FIG. 2 to switch between the introduction of a fast or a slow rate response rate into a feedforward control signal when producing the feedforward control signal.
Figure 4:
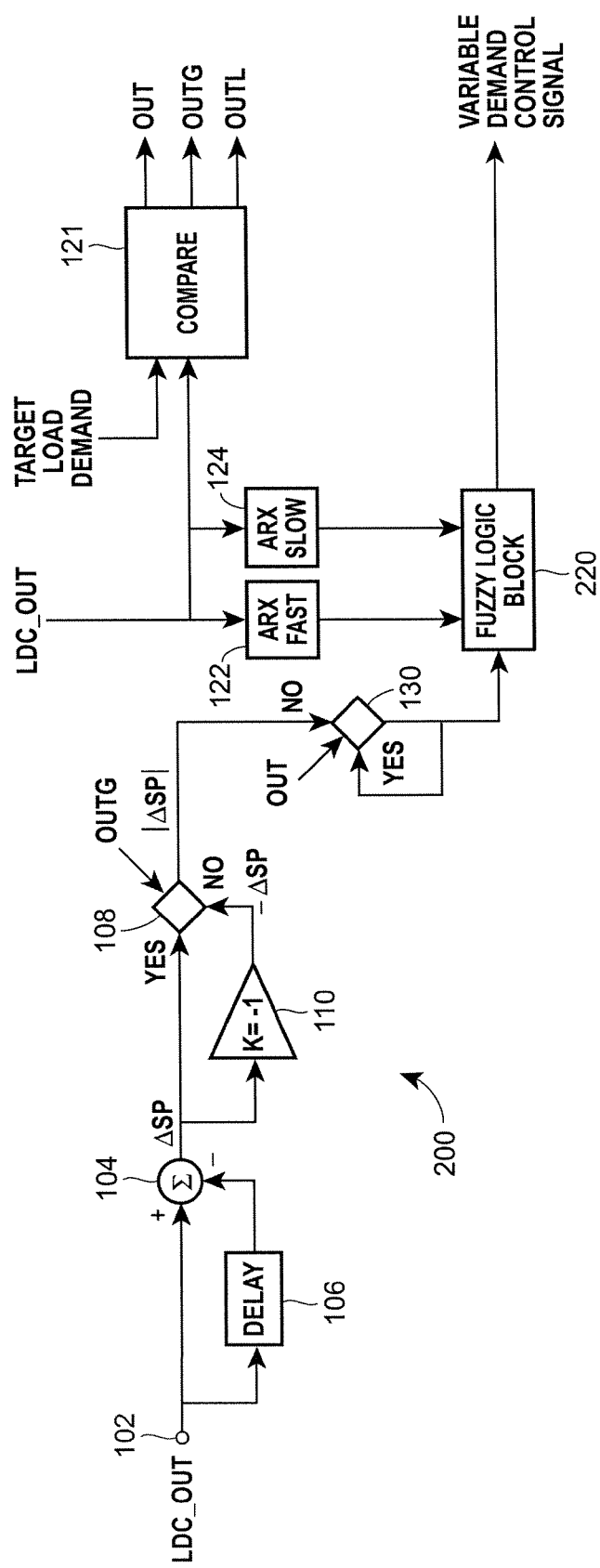
FIG. 4 illustrates a block diagram of another example control routine used as part of a feedforward control circuit which uses a fuzzy logic block to switch between a feedforward control signal generated with a fast response characteristic and a feedforward control signal generated with a slow response characteristic to be used to control a power generating unit.
Figure 5:
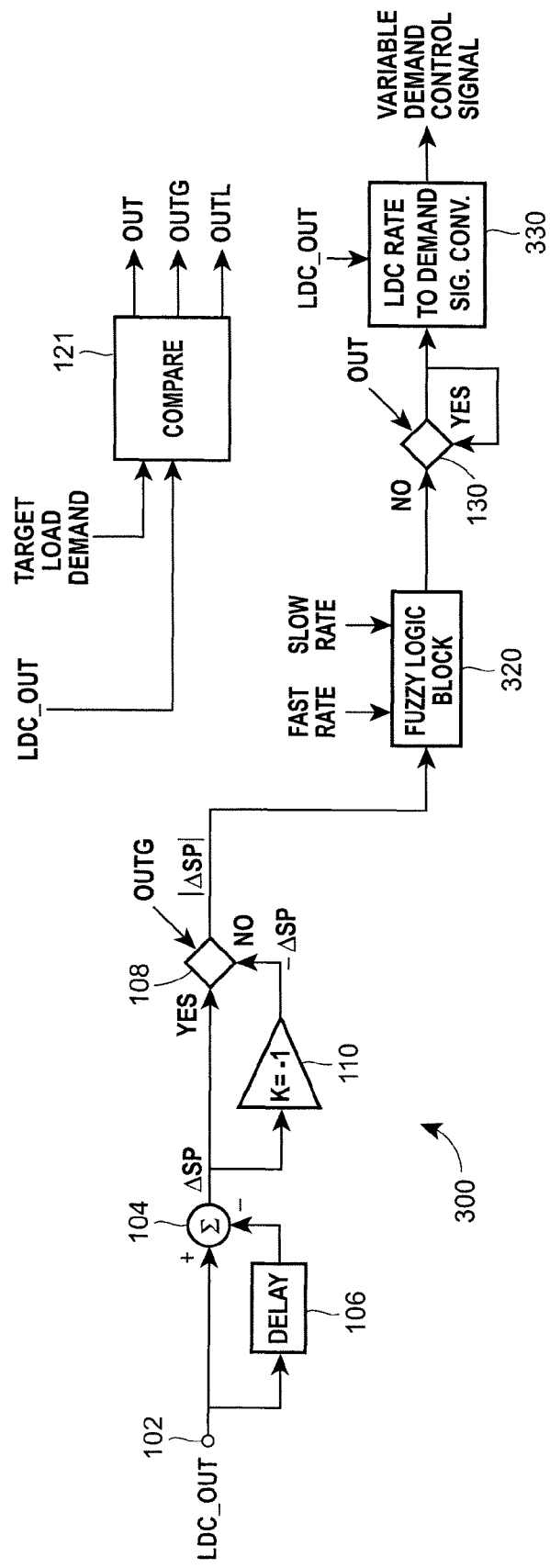
FIG. 5 illustrates a block diagram of a still further example control routine used as part of a feedforward control circuit which uses a fuzzy logic block to switch between a fast and a slow rate for use in producing a feedforward control signal to be used to control a power generating unit.

FIGS. 3-5 illustrate a number of different control circuits or control techniques that may be used to implement the feedforward control routine generally described above so as to provide enhanced or better control of slow reacting equipment in, for example, a power plant, by causing a faster initial response in the power plant generating unit to a load demand set point change in a manner that causes minimal overshoot and/or and swing within a plant output (e.g., power, steam pressure, etc.)

In particular, FIG. 3 illustrates a feedforward control circuit 100 which may be used in a feedforward controller, such as the controller 50 or 60 (and especially 60) of FIG. 2, to implement the control concept described above, that is, one in which a fast or a slow response characteristic is integrated into a feedforward control signal based on the average or a moving average of a load demand set point rate of change over some previous period of time. As illustrated in FIG. 3, a load demand signal LDC_OUT, which represents the current load demand set point (i.e., the load demand set point for the current time), is provided to an input 102 of the feedforward control circuit 100. The load demand signal LDC_OUT, which may be produced by the LDC 22 of FIG. 1 as the LDC index, may be expressed as, for example, an actual amount of power to be output by the plant (e.g., megawatts), an index representing a percentage of the entire possible output of the plant (e.g., a percent capacity) or any other desired type of units. The load demand signal LDC_OUT is provided via the input 102 to both a summer 104 and to a delay circuit 106. The delay circuit 106 delays the load demand signal LDC_OUT by a certain predetermined amount of time such as, for example, 10 minutes, so that the output of the delay circuit 106 represents the load demand signal LDC_OUT at a predetermined time in the past (prior to the current time). The output of the delay circuit 106 is provided to the summer 104 where the delayed load demand signal is subtracted from the current value of the load demand signal LDC_OUT to produce a change in set point signal $\Delta SP$. Essentially, the change in set point signal $\Delta SP$ is the difference between the load demand set point at the current time and the load demand set point at a predetermined time in the past, and represents an average rate of change in the load demand set point over the predetermined period of time (which may be considered to be a unit length of time).

The output of the summer 104, i.e., the change in the set point signal $\Delta SP$ over a fixed period of time, is provided to a first input of a transfer block 108 as well as to a gain block 110. The gain block 110 simply inverts the sign of the change in set point signal $\Delta SP$ (e.g., multiplies the change in the set point signal $\Delta SP$ by a negative one) to produce a negative change in set point signal $-\Delta SP$, which is provided to a second input of the transfer block 108. As will be understood, the summer 104 may produce a change in set point signal $\Delta SP$ having either a positive sign or a negative sign, depending on whether the load demand set point signal (i.e., the LDC_OUT signal) is currently increasing or decreasing and is thus greater than or less than the load demand set point signal at the predetermined time in the past (as output by the delay circuit 106). Generally speaking, the transfer block 108 operates as switch to provide either the change in the set point signal $\Delta SP$ developed by the summer 104 or the inverted sign version of that signal $-\Delta SP$ produced by the gain block 110 to a switching block 120 through a transfer block 130. More particularly, the transfer block 108 is controlled to always provide a positive signal at the output of the transfer block 108 and thus generally operates to provide the absolute value of the change in the set point signal $\Delta SP$ produced by the summer 104 to the transfer block 130.

A comparator block 121 illustrated in FIG. 3 is used to control the transfer block 108 and the transfer block 130. In particular, the comparator block 121 compares a target value of the load demand set point signal (i.e., the target value of the load demand set point signal at some known time in the future) provided at a first input of the comparator block 121 to the current load demand set point signal (the LDC_OUT signal) provided to a second input of the comparator block 121. The comparator block 121 produces three output signals indicated as Out, OutG and OutL based on these two inputs. The Out signal equals a logical one or is set high when the target value of the load demand set point signal and the current load demand set point signal are equal to one another, and will be zero or low at all other times. Thus, the Out signal produced by the comparator block 121 represents whether the load demand set point has reached its final or target value (at least as is currently known). The OutG signal equals a logical one or is set high when the target value of the load demand set point signal is greater than the current load demand set point signal and is a logical zero or is set low at all other times. On the other hand, the OutL signal equals a logical one or is set high when the target value of the load demand set point signal is less than the current load demand set point signal, and is a logical zero or is set low at all other times.

As illustrated in FIG. 3, the OutG signal produced by the comparator 121 is used as a control signal for the transfer block 108, so that when the OutG signal is a logical one (meaning that the target load demand set point is greater than the current load demand set point) the transfer block 108 will simply provide the change in set point signal $\Delta SP$ to the input of the transfer block 130, as this signal will already be positive (due to the fact that the load demand set point is increasing towards the target load demand set point). On the other hand, if the OutG signal is not a logical one, the transfer block 108 will provide the output from the gain block 110 to input of the transfer block 130 thereby providing the inverted signed version of the change in the set point signal $-\Delta SP$ to the block 130. However this signal will have a positive sign, because the load demand set point signal is decreasing towards the target load demand set point meaning that the current load demand set point should be greater than the target load demand set point at the predetermined time in the past.

As indicated above, the output of the transfer block 108 is provided to the transfer block 130 and then to the switching block 120 which, in this case, provides one of two different feedforward control signals developed from the current load demand set point signal as an output. In particular, a fast action feedforward transfer function block 122 develops a feedforward control signal from the current load demand set point signal (LDC_OUT) having a high "kicking" action or a relatively fast or quick response characteristic (such as a leading response action), while a slow action feedforward transfer function block 124 develops a feedforward control signal from the current load demand set point signal (LDC_OUT) having a low or no "kicking" action (i.e., a relatively low or slow acting response characteristic such as a lagging response characteristic). The feedfoward control signals produced by the blocks 122 and 124 are provided to the switching block 120, which outputs one of these signals based on the magnitude or absolute value of the change in load demand set point signal $\Delta SP$ provided to the switching block 120 from the transfer block 130. It will be understood that the blocks 122 and 124 are illustrated as using a discrete-time transfer function (ARX) which, in this case, indicates the use of an AutoRegressive model with eXogeneous input. However, other transfer function blocks could be used to produce the feedforward control signals with the fast or slow response rate characteristics if so desired.

In particular, the switching block 120 selects either the output of the block 122 or the output of the block 124 based on a comparison of the absolute value of the change in the load demand set point $\Delta SP$ to a predetermined or preset threshold, and provides the selected signal to the output of the switching block 120 based on the comparison (i.e., depending on the magnitude of the change in load demand set point signal). For example, if the change in load demand set point signal provided by the transfer block 108 (via the transfer block 130) is less than a particular threshold, the switching block 120 provides the output of the transfer function block 122 (including a high or relatively fast acting response characteristic) as a feedforward control output referred to herein as a variable demand control signal. However, if the change in the load demand set point signal provided by transfer block 108 (via the transfer block 130) is greater than the particular threshold, the switching block 120 provides the output of the transfer function block 124 (including a low or relatively slow acting response characteristic) as a control output referred to herein as a variable demand control signal. As will be understood, the magnitude or absolute value of the change in the load demand set point signal ΔSP represents the rate (e.g., an average rate) of change of the load demand set point signal over a particular period of time.

In any event, to assure correct operation of the switching block 120, the output of the transfer block 108 is provided to the transfer block 130 which operates to provide either the output of the transfer block 108 as a new output, or to keep the previous output value of block 130 as the input to the switching block 120. In particular, the transfer block 130 operates based on the value of the Out signal produced by the comparator 121, and provides the previous output signal as the new output when the Out signal is a logical one (i.e., when the current load demand set point is equal to the target load demand set point). Conversely, the transfer block 130 provides the output of the transfer block 108 as the new output signal when the Out signal developed by the comparator 121 is other than a logical one.

Basically, the transfer block 130 operates to assure that the speed of the feedforward control signal (i.e., having a fast or slow characteristic) produced by the switching block 120 is not changed once the load demand set point is at a steady state value (i.e., is not ramping up or down to a new set point value). This feature is important because, otherwise, the feedfoward control signal (output by the block 120) will switch from a fast response at the beginning to a slow response near the end and then gradually switch back to fast response again due to the fact that the average rate of change of load demand signal over the specified past time interval starts to decrease after the load demand set point reaches the target value and stays there. In other words, the transfer block 130 operates to prevent switching between the two different feedforward signals (the high response rate feedforward signal produced by the block 122 and the low response rate feedforward signal produced by the block 124) when the current load demand set point signal stops moving (i.e., has reached the target value). Thus, if the Out signal produced by the comparator block 121 is a logical one, meaning that the current load demand set point signal and the final or target load demand signal are equal, the transfer block 130 operates to simply keep the input to the block 120 (i.e., the output of the block 130) the same as it was the previous time. However, if the current load demand set point signal is less than or greater than the final or target load demand set point signal, meaning that the LDC index has not yet reached a known target value, the transfer block 130 operates to allow the feedforward control signal, as produced by the switching block 120, to be based on the current output of the transfer block 108 and provided as the variable demand control signal for use in downstream control.

FIG. 4 illustrates a further feedforward control circuit 200 that may be used to implement the control technique described above which switches between different feedforward control signals based on a previous rate of change of the load demand set point. The circuit 200 of FIG. 4 is very similar to the circuit 100 of FIG. 3 and like elements are indicated with the same reference numbers. More particularly, the circuit 200 is similar to the circuit 100 of FIG. 3 except that the switching block 120 is replaced by a fuzzy logic block 220. The fuzzy logic block 220 operates as a more complicated (in this case, a non-linear) switch to smooth out the non-linearities introduced into the feedforward control signal (the variable demand control signal) caused by abruptly changing between the fast and slow feedforward control signals produced by the blocks 122 and 124 when the change in load demand set point signal ΔSP moves across the predetermined threshold (i.e., moves from below the predetermined threshold to above the predetermined threshold or moves from above the predetermined threshold to below the predetermined threshold).

As will be understood, the fuzzy logic block 220 may include multiple fuzzy membership functions, one associated with the change in the load demand set point signal ΔSP being well below the predetermined threshold for use in selecting the fast control action produced by the block 122 and one associated with the change in the load demand set point signal ΔSP being well above predetermined threshold to provide the slow feedforward control action produced by the block 124. However, near and at the predetermined threshold, some combination of the outputs of the blocks 122 and 124 may be used as the output feedforward control signal, based on, for example, the relative closeness of the change in the load demand set point signal ΔSP to the predetermined threshold, and whether the change in the load demand set point signal ΔSP is above or below the predetermined threshold. Thus, the fuzzy logic block 220 may be used to create a variable demand control signal as the output of the block 122 when the magnitude of the change in the load demand set point signal ΔSP is well below the predetermined threshold, to create a variable demand control signal as the output of the block 124 when the magnitude of the change in the load demand set point signal ΔSP is well above the predetermined threshold and to create a variable demand control signal as some weighted combination of the outputs of the blocks 122 and 124 when the magnitude of the change in the load demand set point signal ΔSP is near (slightly above, equal to or slightly below) the predetermined threshold. As will be understood, the fuzzy logic block 220 thereby operates to smooth the value of the feedforward control signal produced by the block 220 over time when this signal is being switched from the output of the block 122 to the output of the block 124 or vise-versa to thereby smooth out any abrupt bumps in the feedforward control signal as a result of such a change.

FIG. 5 illustrates a further embodiment of a feedforward control circuit 300 that may be used to implement the control technique described above. The circuit 300 of FIG. 5 is very similar to the circuit 200 of FIG. 4 and like elements are indicated with the same reference numbers. More particularly, the circuit 300 is the same as the circuit 200 of FIG. 4 except that a fuzzy logic block 320 receives two feedforward response rates instead of actual feedforward control signals developed using different rates. And in addition, the transfer block 130 is moved after fuzzy switching block 320. In particular, the fuzzy logic block 320 receives a fixed fast response rate used to produce a fast response characteristic or a high amount of "kicking" action (e.g., a leading response) within a feedforward control signal, and receives a fixed slow response rate used to produce a slow response characteristic or a lesser amount of "kicking" action (e.g., a lagging response) within a feedforward control signal. In this example, the output of the fuzzy logic block 320 indicates or provides a response rate to be used to create a feedforward control signal, instead of the actual feedforward control signal itself. Thus, the output of the fuzzy logic block 320 is a variable rate used to create the variable demand control signal. These feedforward rates may be characterized either as a static ramp rate or as the decay rate produced by a frequency domain transfer function.

During operation, the fuzzy logic block 320 may combine or produce a mixed or weighted response rate by combining the fast and slow rates depending on the particular membership functions defined for the fuzzy logic block 320 and on the value of the magnitude of the change in the load demand set point signal $\Delta SP$ received from the transfer block 108 and the threshold being used. In any event, the transfer block 130 passes a new variable response rate, as developed by the fuzzy logic block 320, or the previously used response rate based on the value of the Out signal developed by the comparator 121.

As will be seen in FIG. 5, the variable response rate passed by the transfer block 130 is then provided to an LDC rate to LDC demand signal converter block which develops a variable demand control signal based on the response rate provided to the input thereof as well as on the current load demand set point signal (LDC_OUT). Converting the response rate to a demand control signal is known in the art and thus will not be described in detail herein. However, if the variable rate passed by the transfer block 130 is associated with the fast acting response, the variable demand control signal will be generated with a fast response characteristic. Alternatively, if the variable rate passed by the block 130 is associated with the slow acting response, the variable demand control signal will be generated with a relatively low response characteristic. Of course, if the variable rate passed by the block 130 is some combination of the fast and slow rates, the variable demand control signal will be generated with a response characteristic somewhere between the fast and slow response characteristics associated with the fast and slow rates provided to the fuzzy logic block 320.

While the circuits 100, 200 and 300 of FIGS. 3-5 each show or illustrate the calculation of a change in the load demand set point signal $\Delta SP$ as being a simple difference between a current load demand set point and a previous load demand set point, other types of calculations could be used to develop a moving average of the difference, or an average rate of or the moving average of the average rate of change of the load demand set point including, for example, an average of three or more instances of the load demand set point signal at multiple points over the particular time period, e.g., the time period associated with the delay circuit 106, a weighted average of the load demand set point signal at multiple points over the particular time period, wherein different weights may be associated with each point, etc. Likewise, if desired, any other type of switching block besides a simple threshold-based switch, or a fuzzy logic switch, could be used in any of the circuits 100, 200 or 300 to implement a switch between feedforward control signals or feedforward rates (used to produce feedforward control signals). Likewise, the switching blocks 120, 220 and 320 could switch between more than two feedforward control signals or rates if so desired, based on multiple threshold values associated with the moving average of rate of change of the load demand set point over a previous period of time.

Figure 6:
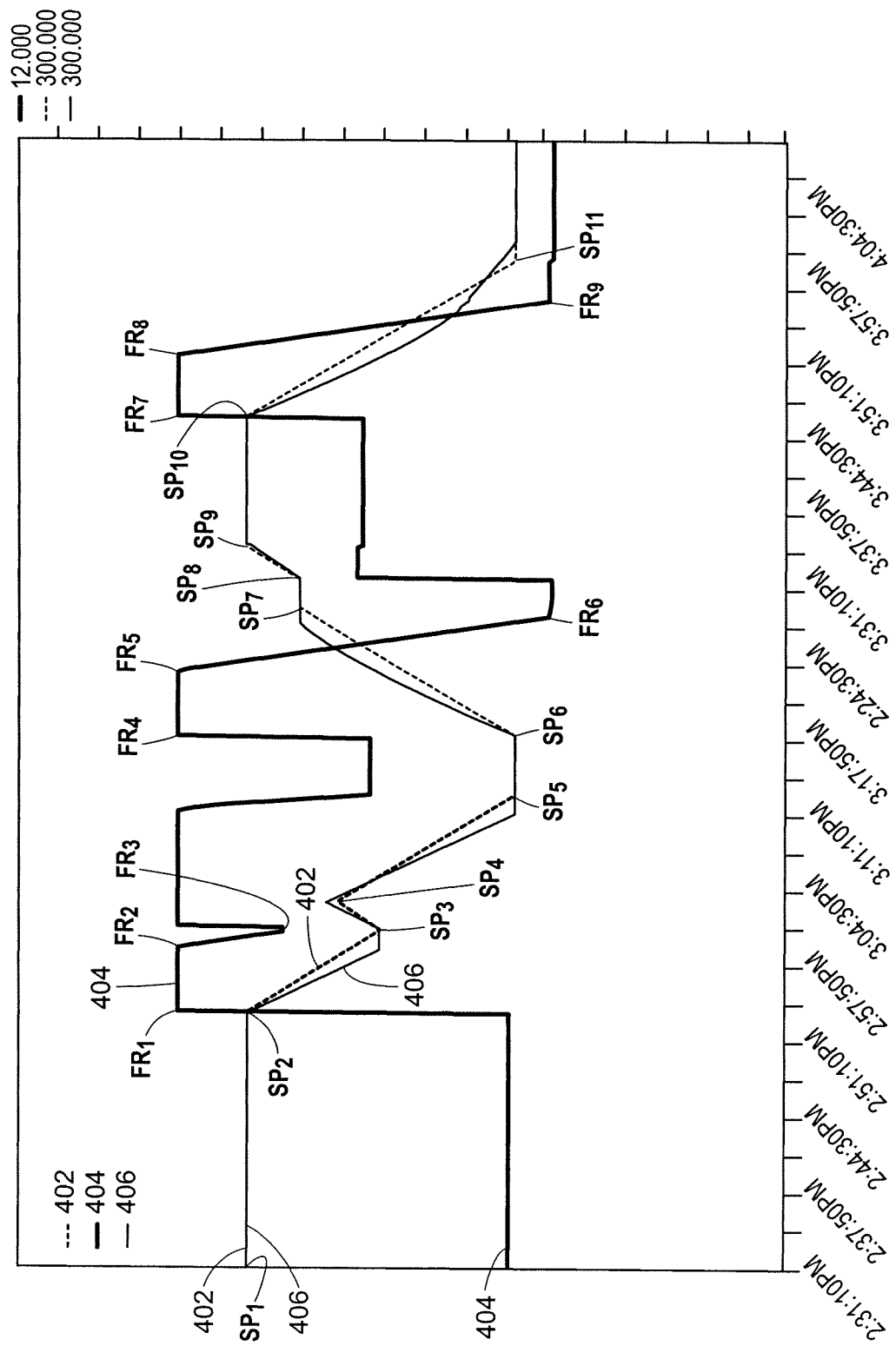
FIG. 6 illustrates a simulated signal diagram associated with the use of the control routine of FIG. 5, illustrating the manner in which various signals associated with the circuit of FIG. 5 changed during simulated operation of the circuit of FIG. 5.

A simulation of a control routine using the control technique described above for the system of FIG. 5 was implemented, and the results of this simulation are illustrated in FIG. 6 as a signal plot showing the values of various signals within the circuit 300 of FIG. 5 during operation of the simulation. As will be seen, the line 402 represents the current load demand set point at any particular time and varies in response to, for example, a change made by the system operator 20 of FIG. 1. As will be seen, during the total time of operation (approximately 2:31:10 PM to 4:04:30 PM) this set point experienced multiple changes in the simulation. In particular, this set point remained constant between points $SP_1$ and $SP_2$, ramped down between points $SP_2$ and $SP_3$, ramped back up between points $SP_3$ and $SP_4$, ramped down between points $SP_4$ and $SP_5$, remained constant between points $SP_5$ and $SP_6$, ramped up to $SP_7$, leveled off to $SP_8$, ramped up to $SP_9$, leveled off to $SP_{10}$ and ramped down to $SP_{11}$, where-after it leveled off and remained constant.

It is useful, in this instance, to view the operation of the control circuit by observing the fuzzy variable rate (illustrated by the line 404) used to create the variable demand control signal (illustrated by the line 406) in response to changes in the load demand set point signal 402. The fuzzy variable rate 404 is actually the output of the transfer block 130 of FIG. 5 and thus depends on the operation of the fuzzy logic block 320 as well as whether the current load demand set point has reached a steady state or final value.

In any event, as will be seen in FIG. 6, the fuzzy variable rate 404 used to create the variable demand control signal 406 increases immediately from a slow rate to a fast rate at a point $FR_1$ when the load demand set point signal 402 begins to ramp down between points $SP_2$ and $SP_3$ and remains at that level until the average rate of change of the load demand signal nears the pre-established threshold (which occurs at a point $FR_2$) where the fuzzy variable rate output by the block 320 begins to ramp down due to a mixing of the fast and slow rates. However, at a point $FR_3$ the fuzzy variable rate levels off for a small amount of time because the load demand set point signal 402 has reached a target value. During the time between $FR_1$ and $FR_2$, however, the actual variable demand control signal 406 slopes at a rate faster than rate of change (slope) of the load demand set point signal 402, indicating the presence of the fast response characteristic in the feedforward control signal which operates to increase the initial response time of the system in response to the change in the load demand set point at the point $SP_2$.

Another illustrative portion of the graph of FIG. 6 begins at point $SP_6$ on the load demand set point curve 402 which, at this time ramps up to a higher target value where it levels off at $SP_7$, after remaining constant for a time (between $SP_5$ and $SP_6$). In response to the change in the average rate of change of the load demand set point which begins to occur at $SP_6$, the fuzzy variable rate (which had also been constant due to the fact that the load demand set point had reached a previous target value), immediately increases at a point $FR_4$ to the fast or high rate and remains at this rate for some time (until $FR_5$). However, at the point $FR_5$, the average rate of change of the load demand set point over the past predetermined period of time nears the predetermined threshold, so that the fuzzy variable rate output by the fuzzy logic block 320 begins to ramp down to the slower rate until the slow rate is reached at the point $FR_6$. In particular, during the time between $FR_5$ and $FR_6$ the variable rate output by the fuzzy logic block 320 is some combination of the fast and slow rate and during this time the average rate of change of the load demand set point signal crosses above the predetermined threshold to cause the transition from the fast to the slow rate. As a result of this change, the magnitude of the slope of the variable demand control signal 406 created using the fuzzy variable rate 404 begins to decrease from being greater than the magnitude of the slope of the load demand set point signal 402 to being less than the magnitude of the slope of the load demand set point signal 402 (which change in slope of the variable demand control signal 406 is caused by the switching from the fast rate to the slow rate). However, the change in the slope of the variable demand control signal 406 is not abrupt, but is smoothed out over time (as denoted by the curve in this line) due to the operation of the fuzzy logic block 320. In any event, as can be seen in this example, the fast rate associated with the fuzzy logic block results in the creation of a variable demand control signal (i.e., the feedforward control signal) with a response characteristic defined by a slope (rate of change) that is greater than the fixed rate of change of the load demand set point signal during the same time, and the slow rate associated with the fuzzy logic block results in the creation of variable demand control signal with a response characteristic defined by a slope (rate of change) that is less than the fixed rate of change of the load demand set point signal during the same time.

A similar situation can be observed between the points $SP_{10}$ and $SP_{11}$, during which time the load demand set point signal 402 ramps down at a constant or fixed rate. However, as can be seen in FIG. 6, the fuzzy variable rate immediately increases at $FR_7$ to the fast rate in response to the initial change of the load demand set point at $SP_{10}$ and remains at the high rate for some time (until $FR_8$). At the point $FR_8$, the average magnitude of the rate of change in the load demand set point for a previous period of time approaches (and eventually goes above) the predetermined threshold, causing the fuzzy variable rate to move down to the slow rate, which is reached at a point $FR_9$. During this time, the variable demand control signal 406 changes from a slope of a higher magnitude (associated with the high rate) to a slope of a lesser magnitude (associated with the low rate) as evidenced by the curve in this portion of the line 406 (i.e., between the points $FR_8$ and $FR_9$). In this case, the variable demand control signal actually reaches the target set point value at a later time than the load demand set point signal, but does so to prevent overshoot and swing in the plant output parameters (such as steam pressure, and power output).

Thus, as will generally be seen from FIG. 6, the operation of the control circuit 300 produces a feedforward control signal 406 that has a higher or faster response characteristic for controlling the process plant equipment immediately after a change in the load demand set point signal 402, even when the change in the load demand set point signal 402 is small in magnitude. As a result, the circuit 300 provides an immediate "kicking" action in response to any load demand set point change, which is different than previous techniques which relied on the difference between the current load demand set point and the final or target value of the load demand set point to be reached when determining whether to use a fast or a slow response characteristic or rate within the feedforward signal. However, as can also be seen from FIG. 6, when the load demand set point signal 402 has been changing for a while at a constant rate, the control system backs off from using the high response rate or characteristic in the feedforward control signal to prevent or lessen the occurrence of swing and overshoot in the output of the system. Thus, for example, between points $SP_6$ and $SP_7$ and between the points $SP_{10}$ and $SP_{11}$ of the curve 402, where the load demand set point 402 ramps at a constant rate of change for a longer period of time, the system initially creates a feedforward control signal with the fast response characteristic but, over time, backs down to producing a feedforward control signal with a slow response characteristic anticipating that the load demand set point signal will stop changing, and thus reducing the occurrence of swing and overshoot when the load demand set point signal reaches a target value. In fact, the longer that the load demand set point signal has been changing and thus the longer that the feedforward control signal with a fast response characteristic has been used, the more prominent the swing and overshoot may when the load demand set point levels off, due to the fact that the system has been undergoing controlled change for some time and thus has built up more "inertia" in response to the previous control signals and will be harder to slow down and stop in the presence of this system "inertia."

As will be seen from FIG. 6, the variable demand control signal 406 produced by the circuit of FIG. 5 can stop increasing (i.e., will level off at a target value) before or after the load demand set point signal 402 reaches the target value. The reason for this phenomena is that the variable demand control signal 406 is not determined by referencing the baseline (fixed rate) load demand set point signal 402 when deciding when to level off. Instead, the variable demand control signal 406 only depends on the variable rate (from the transfer block 130) and the final load demand set point target. Once the variable demand control signal 406 reaches a local target and the target does not move any more, then the variable demand control signal 406 will stop moving (i.e., will level off at the target level). This action is performed by the LDC rate to demand signal conversion block 330 of FIG. 5, which is standard practice. However, the situation will be different for the circuits of FIGS. 3 and 4, where the variable demand control signal always settles down after the baseline or fixed rate load demand set point signal reaches the final (local) target set point.

As a general matter, the fast rate used in the example of FIG. 6 was 9 MW/min and the slow rate was 1 MW/min, with the baseline or fixed LDC demand (curve 402) rate of change being at 7 MW/min. The switching or threshold value was set to a 40 MW difference in set point change measured over a 10 minute and 30 seconds time interval. As a result, the average rate of load demand set point change for switching in FIG. 6 was approximately a 4 MW/min. threshold value. However, these are example values only and other values for the set point change threshold, rate of change of the load demand set point (line 402), fast and slow rates, etc. could be used depending on the specifics of the system being controlled.

Generally speaking, the fast and slow (or leading and lagging) response rates used to produce the variable demand control signal (the feedforward control signal) are determined with respect to the boiler process response speed, with the fast or leading rate being faster than the boiler process response speed and the slow or lagging response rate being slower than the boiler process response speed. In many cases, the rate of change of the load demand set point, also referred to herein as the fixed rate of change of the load demand set point used by the system operator, is the same as or is closely related to the boiler process response speed, in which case the fast and slow response rates or characteristics of the feedforward control signal may be relative to the fixed rate of change of the load demand set point. Moreover, in one embodiment, the threshold value may be related to the average rate at which the load demand set point signal changes or is expected to change. Thus, if desired, the threshold value may be set equal to or less than expected maximum achievable average rate of change in the load demand set point signal to enable the system to switch over to the slow rate at an appropriate time.

While the forgoing description of a feedforward control circuit has been described in the context of controlling a power generating plant and, in particular, a boiler and turbine operated power generating plant, this control method can be used in other process control systems, such as in industrial process control systems used to control industrial or manufacturing processes. More particularly, this control method may be used in any process plant or control system that receives numerous set point changes and which controls slow reacting equipment, and additionally may be used to produce feedforward control signals or other types of control signals in these or other environments.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of controlling a power generating unit using a feedforward control signal developed from a load demand set point signal indicating a desired output of the power generating unit, comprising:
   determining a magnitude of a rate of change of the load demand set point signal during a particular period of time prior to a current time;
   comparing the determined magnitude of the rate of change of the load demand set point signal during the particular period of time to a threshold;
   creating the feedfoward control signal with a fast response rate characteristic when the determined magnitude of the rate of change of the load demand set point signal during the particular period of time is below the threshold and creating the feed forward control signal with a slow response rate characteristic when the determined magnitude of the rate of change of the load demand set point signal during the particular period of time is greater than the threshold; and
   using the feedforward control signal to control the power generating unit.

2. The method of controlling a power generating unit of claim 1, wherein the load demand set point signal ramps between two values at a fixed rate and wherein the fast response rate characteristic results in a feedforward control signal that changes at a rate greater than the fixed rate and wherein the slow response rate characteristic results in a feedforward control signal that changes at a rate less than the fixed rate.

3. The method of controlling a power generating unit of claim 1, wherein determining the magnitude of the rate of change of the load demand set point signal during the particular period of time prior to the current time includes determining a difference between a current value of the load demand set point signal and a value of the load demand set point signal at the beginning of the particular period of time.

4. The method of controlling a power generating unit of claim 1, wherein determining the magnitude of the rate of change of the load demand set point signal during the particular period of time prior to the current time includes determining a moving average of the rate of change of the load demand set point signal during the particular period of time.

5. The method of controlling a power generating unit of claim 1, wherein determining the magnitude of the rate of change of the load demand set point signal during the particular period of time prior to the current time includes determining a weighted average of the rate of change of the load demand set point signal during the particular period of time with different weights being associated with different times.

6. The method of controlling a power generating unit of claim 1, wherein creating the feedforward control signal includes creating the feedforward control signal with the fast response rate characteristic when the determined magnitude of the rate of change of the load demand set point signal during the particular period of time is well below the threshold, and creating the feedforward control signal with the slow response rate when the determined magnitude of the rate of change of the load demand set point signal during the particular period of time is well above the threshold and creating the feedforward control signal as a weighted combination of the fast response rate and the slow response rate when the determined magnitude of the rate of change of the load demand set point signal during the particular period of time is near or at the threshold.

7. The method of controlling a power generating unit of claim 6, wherein creating the feedforward control signal includes using a fuzzy logic technique to create the feedforward control signal as a weighted combination of the fast response rate and the slow response rate.

8. The method of controlling a power generating unit of claim 7, wherein using the fuzzy logic technique includes combining a first control response rate and a second control response rate based on the value of the magnitude of the rate of change of the load demand set point signal during the particular period of time.

9. The method of controlling, a power generating unit of claim 7, wherein using the fuzzy logic technique includes combining a first feed forward control signal calculated using a first response rate and a second feed forward control signal calculated using a second response rate based on the value of the magnitude of the rate of change of the load demand set point signal during the particular period of time.

10. The method of controlling a power generating unit of claim 1, wherein creating the feedforward control signal further includes using a feedforward control rate calculated for a previous period of time when the load demand set point signal is equal to a target value for the load demand set point signal.

11. A power plant controller, comprising:
   an input to receive a load demand set point signal specifying a load demand set point for each of a series of times;
   a calculation unit that determines a magnitude of a rate of change of the load demand set point associated with a particular period of time prior to a current time;
   a comparison unit that compares the determined magnitude of the rate of change of the load demand set point during the particular period of time to a threshold; and
   a control signal generator that generates a control signal with a fast response rate when the determined magnitude of the rate of change of the load demand set point during the particular period of time is below the threshold and that creates a control signal with a slow response rate when the determined magnitude of the rate of change of the load demand set point during the particular period of time is greater than the threshold.

12. The controller of claim 11, wherein the input receives a load demand set point signal that specifies a target load demand at a particular time in the future and a ramp rate to be used to determine the load demand set point at each of the times between the current time and the particular time in the future.

13. The controller of claim 11, wherein the load demand set point signal ramps between two values at a fixed rate and wherein the control signal generator generates a control signal with the fast response rate by creating a feedforward control signal that changes at a rate greater than the fixed rate and wherein the control signal generator generates a control signal with the slow response by creating a feedforward control signal that changes at a rate less than the fixed rate.

14. The controller of claim 11, wherein the calculation unit determines the magnitude oldie rate of change of the load demand set point associated with a particular period of time prior to the current time by determining a difference between a load demand set point value at the current time and a load demand set point value at a time in the past offset from the current time by the particular period of time.

15. The controller of claim 11, wherein the calculation unit determines the magnitude of the rate of change of the load demand set point associated with a particular period of time prior to the current time by determining an average rate of change of the load demand set point during the particular period of time.

16. The controller of claim 11, wherein the control signal generator generates the control signal with the fast response rate when the determined magnitude of the rate of change of the load demand set point during the particular period of time is well below the threshold, generates the control signal with the slow response rate when the determined magnitude of the rate of change of the load demand set point during the particular period of time is well above the threshold and generates the control signal as a weighted combination of the fast response rate and the slow response rate when the determined magnitude of the rate of change of the load demand set point during the particular period of time is near or at the threshold.

17. The controller of claim 11, wherein the comparison unit comprises a fuzzy logic block.

18. The controller of claim 17, wherein the fuzzy logic block switches between or combines a first feedforward control signal calculated using the fast response rate and a second feedforward control signal calculated using the second response rate, based on the difference between the value of the magnitude of the rate of change of the load demand set point during the particular period of time and the threshold.

19. A method of producing a control signal for use in controlling equipment in a plant, comprising:
obtaining a set of set point signal values for a set point signal specifying the desired operation of the equipment over a particular period of time;
determining a magnitude of a rate of change of the set point signal during the particular period of time based on the set of set point signal values;
comparing the determined magnitude of the rate of change of the set point signal during the particular period of time to a threshold;
creating a control signal for use in controlling the equipment based on the comparison between the determined magnitude of the rate of change of the set point signal during the particular period of time and the threshold, wherein the control signal is created with a first response characteristic when the determined magnitude of the rate of change of the set point signal during the particular period of time is below the threshold and the control signal is created with a second response characteristic when the determined magnitude of the rate of change of the set point signal during the particular period of time is greater than the threshold.

20. The method of producing a control signal of claim 19, wherein determining the magnitude of the rate of change of the set point signal during the particular period of time includes determining a difference between a current value of the set point signal and a value of the set point signal at the beginning of the particular period of time.

21. The method of producing a control signal of claim 19, wherein determining the magnitude of the rate of change of the set point signal during the particular period of time includes determining an average of the rate of change of the set point signal over the particular period of time.

22. A boiler operated power plant, comprising:
a turbine;
a boiler coupled to the turbine that operates to create steam to drive the turbine;
a control unit communicatively connected to the boiler to control the operation of the boiler, the control unit including;
a feedback controller that produces a feedback control signal;
a feedforward controller that produces a feedforward control signal, the feedforward controller including;
an input that receives a load demand set point signal specifying a load demand set point for each of a series of times of operation of the power plant;
a calculation unit that determines a magnitude of a rate of change of the load demand set point over a particular period of time prior to a current time;
a comparison unit that compares the determined magnitude of the rate of change of the load demand set point over the particular period of time to a threshold; and
a feedforward control signal generator that generates the feedfoward control signal to include a first response characteristic when the determined magnitude of the rate of change of the load demand set point over the particular period of time is below the threshold and that creates the feedfoward control signal with a second and different response characteristic when the determined magnitude of the rate of change of the load demand set point over the particular period of time is greater than the threshold; and
a control signal combiner that combines the feedforward control signal and the feedback control signal to create a master control signal for controlling the boiler.

23. The boiler operated power plant of claim 22, wherein the comparison unit or the feed forward control signal generator comprises a fuzzy logic block that switches between first and second feedforward control signals having the first and second response characteristics, respectively, or that switches between first and second response rates wherein the first and second response rates are used to produce the first and second feedforward control signals having the first and second response characteristics, respectively.

24. The boiler operated power plant of claim 22, wherein the calculation unit determines the magnitude of the rate of change of the load demand set point over the particular period of time prior to the current time by determining a difference between a current load demand set point and a load demand set point at the particular time in the past offset from the current time by the particular period of time.

* * * * *

UNITED STATES PATENT AND TRADEMARK OFFICE
CERTIFICATE OF CORRECTION

PATENT NO. : 7,826,908 B2  
APPLICATION NO. : 11/934633  
DATED : November 2, 2010  
INVENTOR(S) : Xu Cheng et al.

Page 1 of 1

It is certified that error appears in the above-identified patent and that said Letters Patent is hereby corrected as shown below:

In the Specification:

At Column 3, line 6, "for a relatively" should be -- for relatively --.

At Column 7, line 45, "then" should be -- than --.

At Column 7, line 53, "then" should be -- than --.

At Column 12, line 46, "vise-versa" should be -- vice versa --.

Signed and Sealed this
Twelfth Day of April, 2011

David J. Kappos
*Director of the United States Patent and Trademark Office*